O. LINDELL.
GEAR CUTTING DEVICE.
APPLICATION FILED MAY 4, 1914.
1,175,365.
Patented Mar. 14, 1916.
2 SHEETS—SHEET 1.
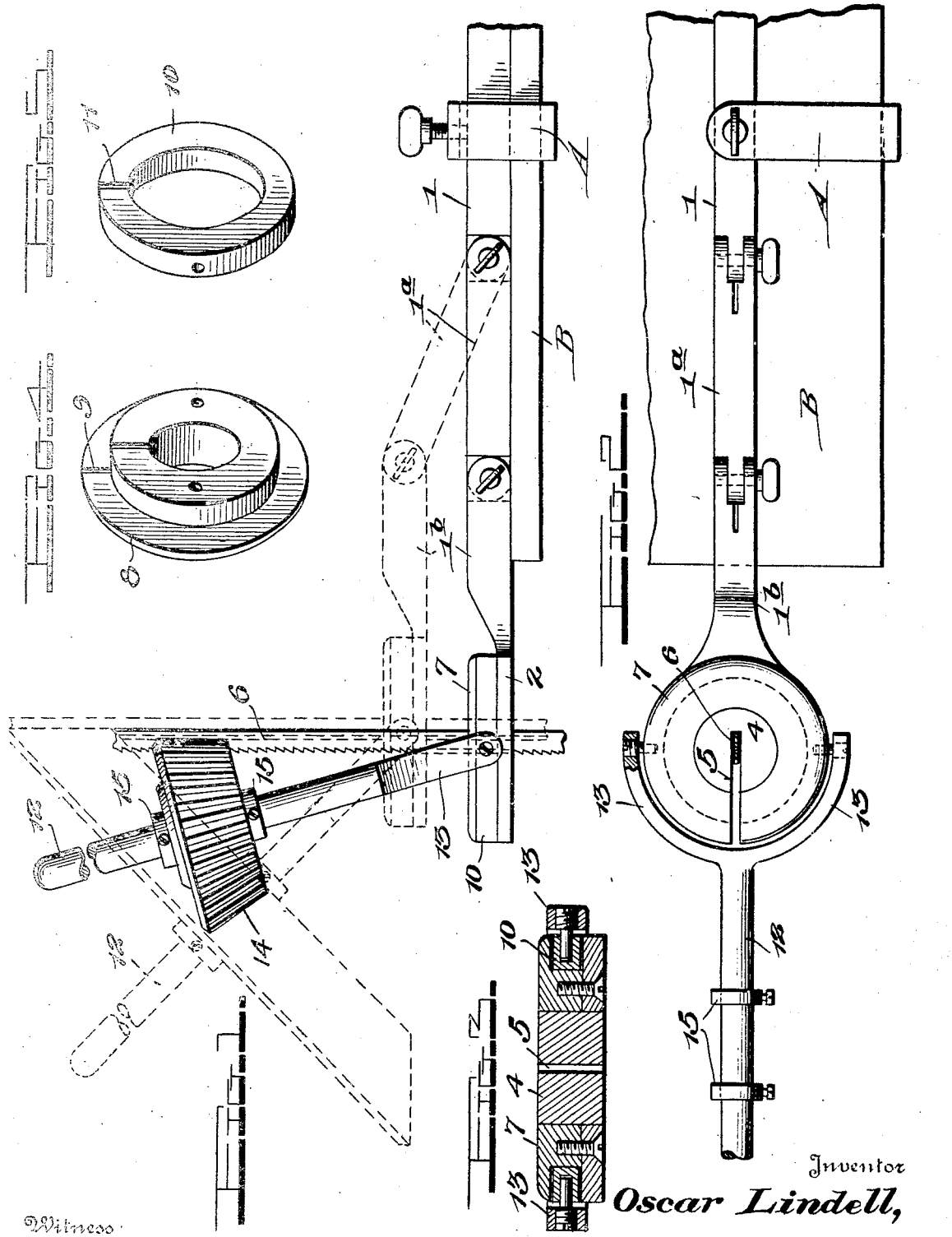
Inventor
Oscar Lindell,
Witness
Chas. L. Griestauer
By Chas G Brock
Attorney

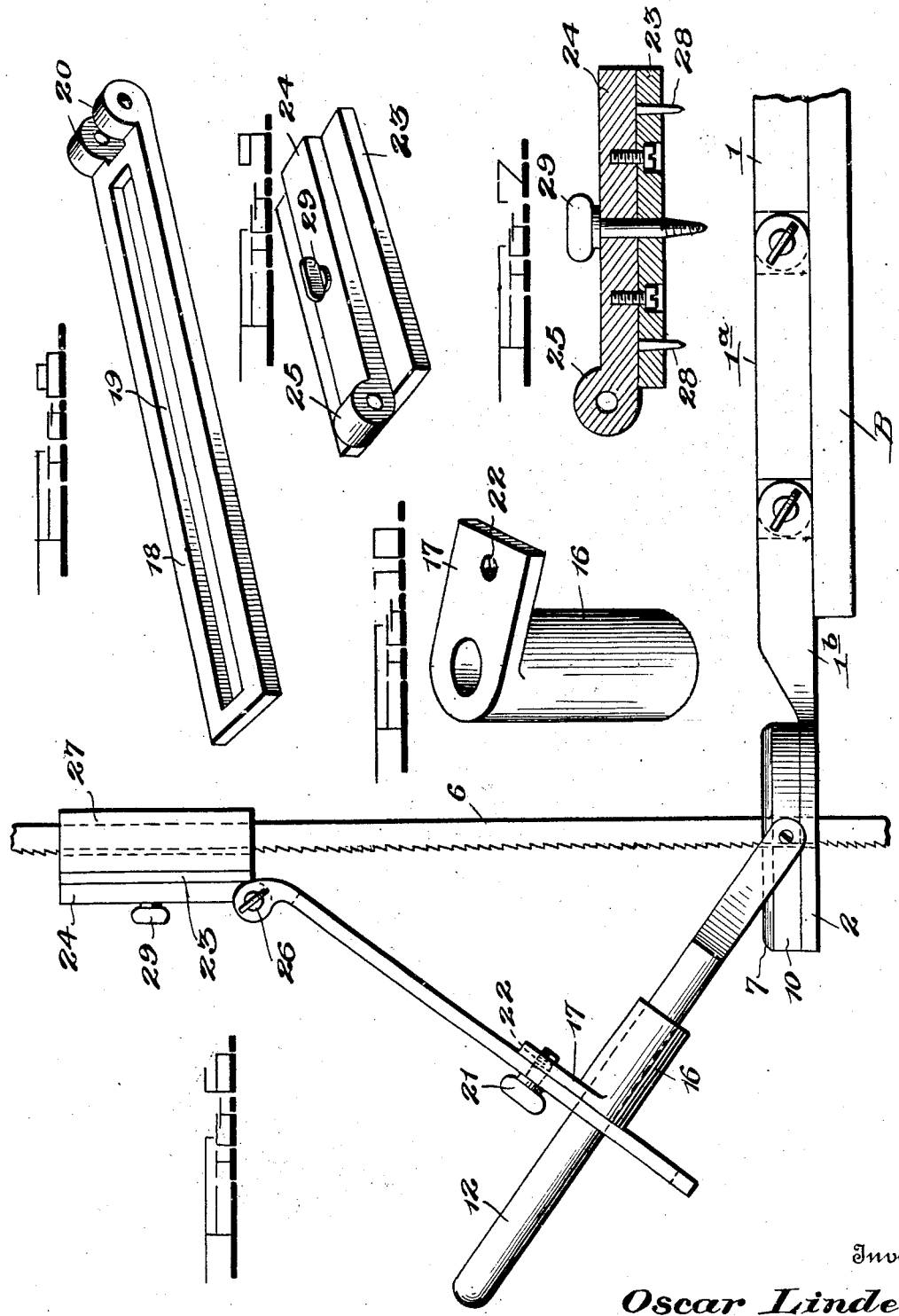

UNITED STATES PATENT OFFICE.

OSCAR LINDELL, OF NORTH ESCANABA, MICHIGAN.

GEAR-CUTTING DEVICE.

1,175,365.  Specification of Letters Patent.  Patented Mar. 14, 1916.

Application filed May 4, 1914. Serial No. 836,279.

*To all whom it may concern:*

Be it known that I, OSCAR LINDELL, a citizen of the United States, residing at North Escanaba, in the county of Delta and State of Michigan, have invented a new and useful Improvement in Gear-Cutting Devices, of which the following is a specification.

This invention relates to a device for cutting gear patterns, the jig being designed for use in cutting from suitable pieces of wood, pinions, bevel gears and single gear teeth.

The invention consists of the novel features of construction hereinafter described, pointed out in the claims and shown in the accompanying drawings, in which:

Figure 1 is a side elevation, a bevel gear pattern of a smaller size being shown in position in full lines, and a pattern of a larger size being indicated in position in dotted lines, the position of the supporting parts of the larger gear being also shown in dotted lines. Fig. 2 is a plan view, partly in section. Fig. 3 is a section on the line 3—3 of Fig. 2. Figs. 4 and 5 are perspective views of split rings. Fig. 6 is a side elevation showing the device with the parts applied thereto for the purpose of cutting an individual gear tooth. Fig. 7 is a sectional view through the tooth holding plate. Fig. 8 is a perspective view of a slotted plate. Fig. 9 is a perspective view of the tooth holding plate. Fig. 10 is a perspective view of a sleeve.

In constructing the device, I employ a sectional post 1, secured by a suitable clamp A to a table B, the sections of which are pivotally secured together and locked by any suitable means, such as set screws, said sections being readily detachable and the post may be shortened or reduced in height by removing an intermediate section 1ª. The outermost section 1ᵇ carries at its outer end a circular back plate 2, centrally cut-out and radially slotted as indicated at 3. In the central opening of said plate fits a cylindrical block 4, also radially slotted as shown at 5, an ordinary band saw 6 being adapted to work vertically in said slots.

Suitably secured to the back plate 2 is a ring 7 provided with a flange 8, the ring and flange being radially slotted as indicated at 9, and a ring 10 fits around the ring 7 resting between the flange 8 and the back plate 2, said ring being cut or slotted as shown at 11, and capable of being turned upon the ring 7. An arm 12 is provided with a yoke 13 which partially incloses the ring 10 and is pivotally connected thereto, so that said arm can be swung in an arc above the post 1 and can also be swung laterally with respect to the saw 6 thereby turning the ring 10 upon the ring 7.

The wooden pattern 14 is fitted upon the arm 12 and held in position between two collars 15 locked in position by means of suitable set screws.

When a pattern for a single tooth is to be cut, a sleeve 16 is fitted upon the arm 12 in place of the collars, said sleeve being provided at one end with a lateral extension 17. A plate 18 is longitudinally slotted at 19 and is provided with perforated ears 20 at one end, said plate fits over the arm 12, bears upon the extension 17 to which it is adjustably secured by means of a thumb nut 21, which passes through the slot 19, threads into a suitable perforation 22 formed in the extension 17.

A flat plate 23 is secured to the underside of a bar 24 provided at one end with a perforated ear 25 adapted to fit between the ears 20 and to be secured there by means of a suitable pintle upon one end of which fits a suitable winged nut 26. The wooden block 27 from which the tooth is to be cut is secured to the plate 23 by means of suitable spurs or nails 28 and also by means of a thumb screw 29.

It will be obvious that the arm 12 may be swung at any desired angle so that the saw 6 can follow any pattern marked out upon the blocks to be cut and by means of this device, pinions, cog wheels, bevel gears and individual gear teeth patterns may be quickly and correctly cut.

In cutting teeth on a bevel gear, as in Fig. 1, the gear teeth are drawn or laid out on the top of the wooden block which is then placed on the arm 12 and the periphery of the block brought into engagement with the band saw 6. This device can be attached to any suitable band saw table, the table and saw forming no part of the invention.

In cutting a single tooth, as in Fig. 6, the tooth to be cut is drawn on the block 27 which is then secured in place and swung by means of the arm 12 into proper engagement with the band saw.

What I claim is:—

1. A pattern cutting jig comprising an adjustable post, a radially slotted plate carried thereby, through which a saw is adapted to work, a split ring supported from and rotatable with respect to said plate, an arm having a yoke pivotally connected to said ring, and means carried upon said arm for holding a pattern.

2. A device of the kind described comprising a sectional post, the said sections being adjustable with respect to each other and also detachable, a back plate carried by one of said sections, said plate being centrally cut-out and radially slotted, a slotted block fitting in the central portion of said plate, a slotted and flanged ring fitted upon said block, a second split ring rotatable upon the first mentioned ring and resting between the flange of the first mentioned ring and the back plate, an arm pivotally carried by said second mentioned ring and means carried by said arm for holding a pattern.

3. The combination with an extensible post, of a ring rotatably carried at the upper end of the post, an arm having a yoke pivotally connected to opposite sides of said ring, and means for securing a pattern to said arm.

4. A device of the kind described comprising an extensible post, a saw receiving block supported by said post, a ring rotatable about said block, an arm having a yoke pivotally connected to said ring, a sleeve upon said arm, a slotted plate secured to an end of said sleeve and movable transversely with respect to said arm and a pattern holding plate pivotally connected to the slotted plate, as and for the purpose set forth.

OSCAR LINDELL.

Witnesses:
  PETER BRANDENBURG,
  GEO. BANGEMANN.